2,893,917

21-XANTHATES AND XANTHOGENIC ACIDS OF Δ⁴ PREGNENES

Poul Borrevang, Copenhagen, Denmark, assignor to Løvens kemiske Fabrik ved A. Kongsted, Copenhagen, Denmark, a firm No Drawing. Application April 18, 1957
Serial No. 653,544

Claims priority, application Great Britain April 23, 1956

14 Claims. (Cl. 167—77)

This invention is concerned generally with novel derivatives of cortisone, hydrocortisone, prednisone, prednisolone, the 6α-methyl substitutes of each of them and similar substances which are 21-hydroxy-pregnenes or -pregnadienes, said derivatives being of acid nature and forming with various bases salts more soluble in water than the parent compound and in some cases even very readily soluble in water, and with processes of preparing such derivatives and salts. More particularly it relates to 21-xanthogenates and 21-xanthogenic acids of $\Delta^4$-pregnenes having keto groups in the 3- and 20-positions and a hydroxy group in the 17α-position and 21-xanthogenates and 21-xanthogenic acids of $\Delta^{1,4}$-pregnadienes having the same groups in the same positions. The invention more particularly is concerned with such derivatives having either a keto group in the 11-position or a hydroxy group in the 11α- or 11β-position in addition to the groups mentioned above and with similar compounds having in addition other groups such as a methyl group in the 6α-position.

Further objects and purposes of my invention will appear from the following specification and from the appended claims.

Cortisone and related substances which are 21-hydroxy-pregnenes or -pregnadienes have a favourable effect in patients suffering from shock. In the treatment of shock-conditions, however, it is desirable that the effect shows quickly. The obtension of a quick effect by said substances is, however, jeopardized by the fact that they are only sparingly soluble in water so that they cannot be introduced directly in the form of aqueous solution into the blood circulation. It has therefore been customary to dissolve the corticoid in ethanol and to inject or infuse intravenously the solution thus obtained in an appropriately diluted state. This method, however suffers from considerable drawbacks particularly owing to the considerable volume of liquid which it is necessary to use. Moreover such infusion cannot normally be arranged outside hospitals although the treatment would often be desirable elsewhere for instance on a place of an accident.

For this and other purposes it would be desirable to have at one's disposal solutions in which the dose necessary is contained in a few millilitres of a liquid injectible into the blood and being in such a form that the active substance will be available to the requirements of the organism with sufficient rapidity.

Compounds of corticoids having greater solubility in aqueous fluids than has the corticoid itself, but not necessarily being very readily soluble may also be utilizable for other purposes, for instance for the production of ointments having corticoid action for dermatological purposes for instance eczema.

It has now been found that hitherto unknown compounds of corticoids which are 21-hydroxy-pregnenes or -pregnadienes can be produced, which compounds are soluble with bases in water and that the production of these compounds can be carried out by introducing in the 21-position of the corticoid the group —O—CS—SH, whereby xanthogenates or xanthogenic acids containing the alcohol residue of the steroid in question are formed.

The compounds produced by this method may be regarded as esters of di-thiocarbonic acid at the hydroxy group thereof in which esters the acid sulphhydryl group of the dithiocarbonic acid is free for which reason they may dissolve in water by means of bases to form xanthogenates, the solubility depending on the nature of the base. It has been found that the xanthogenates hydrolyze very rapidly in the presence of water at pH-values in the vicinity of neutrality, whereby the corticoid is liberated and that on intravenous administration of the xanthogenates in the human organism a corticoid-effect shows very rapidly.

On biological estimation of the gluco-corticoid-effect in rats the new substances show the same effect as a corresponding steroid hormone.

On account of the rapid hydrolysis of the xanthogenate solutions the new substances must be dispensed for therapeutic use either in the form of a dry substance that can be dissolved in water or in the form of the free xanthogenic acid which can be mixed immediately prior to use with an aqueous solution of a base or in the form of ointments containing a more or less soluble xanthogenate and intended for external application.

The introduction of the —O—CS—SH-group into the 21-position of 21-hydroxypregnenes or -pregnadienes can be carried out by reacting the same in a liquid medium with an alkali metal hydroxide and carbondisulphide.

In this manner xanthogenic acids of $\Delta^4$-3,20-diketo-17α,21-dihydroxypregnenes and pregnadienes can be produced from the corresponding corticoids including not only $\Delta^4$-pregnene-3,11,20-triketo-17α,21-diol-21-xanthogenic acid and $\Delta^4$-pregnene-3,20-diketo-11,17α,21-triol-21-xanthtogenic acid (in which the 11-hydroxy group may be in the α or β-position), but also $\Delta^{1,4}$-pregnadiene-3,11-20-triketo-17α,21-diol-21-xanthogenic acid and $\Delta^{1,4}$-pregnediene-3,20 - diketo - 11,17α,21 - triol - 21 - xanthogenic acid (where the 11-hydroxy group may be in the α- of β-position) and related compounds. As examples of related compounds comprised by the invention may be mentioned compounds corresponding to the ones specified above having methyl as substituent in the 6α-position. Even from such related compounds xanthogenic acids and xanthogenates can be produced in the same manner under retension of the improved corticoid action characteristic of corticoids substituted in this manner.

In carrying out the method according to the invention various reaction media can be used provided they are capable of dissolving the steroid and do not react with alkali and carbon disulphide to form xanthogenates themselves. Solvents containing alcoholic groups are therefore generally out of question. It has further been found that the reaction medium must have a certain miscibility with water, preferably of such magnitude that it will dissolve at least 5–10 percent of water. Thus, under otherwise substantially similar conditions of the yield of xanthogenate when using methyl-isobutyl-ketone as reaction medium will be only one third of the yield when using for instance dioxane corresponding to the inferior miscibility with water of the former solvent. By way of example of reaction media which can be used alternatively to the ones already mentioned may be mentioned acetone and other ketones for instance methyl-ethyl-ketone, and dimethyl-foramide. Acetone and dimethyl-formamide in all cases where they have been tried produce just as good yields as dioxane.

The reaction is preferably carried out by treating the solution of the steroid in the organic solvent that has been chosen and which is at least partially miscible with water with an alkali metal hydroxide and reacting the alcoholate thereby formed with carbon disulphide, after which the xanthogenate formed or (after addition of an acid) the free xanthogenic acid are isolated from the solution. During the reaction cooling is preferably employed, if necessary at temperatures close to the freezing point of the solvent. The alkali metal hydroxide may be first added in aqueous solution and after mixing the two phases for a short time carbon disulphide or a solution thereof in the same solvent as the one used for dissolving the steroid or another solvent having similar properties may be added. When the carbon disulphide has acted for some time the xanthogenate will be formed and the aqueous phase may be removed. The organic phase may now be treated in various ways to isolate either the xanthogenate of the base in question or the free xanthogenic acid. In the former case the solution may be dried and evaporated to dryness, or a solvent decreasing the solubility of the xanthogenate in the mixture may be added for instance ether, whereby the xanthogenate separates. In the latter case mentioned above a strong acid such as hydrochloric or sulphuric acid and a solvent may be added and after the aqueous phase has again been removed the organic phase may be evaporated to dryness (remaining water being dried away, if desired, in order to avoid hydrolysis), or solvent may be added in order to separate the free acid for which purpose for instance acetone may be used. The xanthogenate or xanthogenic acid isolated may be re-crystallized and salts may be produced from the acid by dissolving it in the corresponding base.

The free xanthogenic acids are sparingly soluble in water but many of the salts are readily soluble and on this account and on account of their deliquescence it may be difficult to produce them in the pure crystalline state. Thus, the sodium salts are deliquescent, whereas the potassium salts although still very readily soluble can more easily be obtained in the pure state. Even the calcium salts and the zinc salts are readily produced in solid form, but certain amine salts can be particularly readily obtained in the pure crystalline form in spite of good solubility for instance the salts of ethanol amine, diethyl amine and N-ethyl piperidine salts. Even quaternary ammonium salts may be produced.

By way of example of sparingly soluble amine salts the following may be mentioned: diisopropyl amine salts and the salts of diethyl amino-propyl-amine, n-butyl amine and triethanol amine.

To illustrate the solubility of a number of the soluble salts particularly the amine salts the quantity of an aqueous solution of various bases in which 50 milligrams hydrocortisone-21-xanthogenic acid dissolves with formation of salts is stated in the following:

0.5 ml. 1.1 percent of aq. sol. of ethyl amine
1.0 ml. 1.2 percent of aq. sol. of triethyl amine
0.5 ml. 2.7 percent of aq. sol. of $\beta$-diethyl amino ethanol
0.5 ml. 3.0 percent of aq. sol. of $\beta$-dimethyl amino ethanol
1.0 ml. 0.85 percent of aq. sol. of tert. butyl amine
0.5 ml. 2.5 percent of aq. sol. of 1-amino-2-propanole
0.5 ml. 3.0 percent of aq. sol. of 1-diethyl amine-2-propanole
0.5 ml. 0.6 percent of aq. sol. of ammonia
1.0 ml. 0.5 percent of aq. sol. of sodium hydroxide The production of the xanthogenic acids and various salts thereof will be illustrated in the following by a number of examples.

EXAMPLE 1

$\Delta^4$-pregnene-3,11,20-trione-17$\alpha$,21-diol-21-xanthogenic acid 3.00 g. cortisone are dissolved by gentle heating in 90 ml. dioxane free from peroxide, and the solution is cooled in a mixture of ice and water to the freezing point of dioxane. Thereafter, a previously cooled solution of 3.0 g. KOH in 30 ml. water is added while vigorously stirring. The stirring and cooling are continued for 5 minutes, whereafter a solution of 3.0 g. $CS_2$ in 5 ml. dioxane is added in one portion. After further stirring for 15 minutes the reaction mixture is diluted with 200 ml. benzene, and acidified by adding 9 ml. of concentrated hydrochloric acid. The aqueous phase is removed, and the benzene-solution washed three times with water. After drying with $Na_2SO_4$ the solution is evaporated to dryness in vacuo at room temperature and the residue is crystallized by adding acetone. The crystals are filtered off, spread out in a thin layer and dried by standing in air at room temperature. Yield of dried product: 2.55 g. The substance melts at 127–130° C., but by further heating it solidifies and melts again at 230–232° C.

EXAMPLE 2

$\Delta^4$-pregnene-3,20-dione-11$\beta$,17$\alpha$,21-triol-21-xanthogenic acid 3.00 g. hydrocortisone are treated as described in Example 1 the only difference being that the reaction mixture is diluted with 300 ml. ether instead of with 200 ml. benzene. By washing the solution with water the hydrocortisone-21-xanthogenic acid is precipitated. The precipitate is filtered off, washed with ether and air-dried at room temperature. 3.00 g. of the desired substance are thus obtained. The product melts at 110–113° C., but on further heating it solidifies and melts again at 210–213° C.

EXAMPLE 3

$\Delta^{1,4}$-pregnadiene-3,11,20-trione-17$\alpha$,21-diol-21-xanthogenic acid 3.00 g. 1-dehydrocortisone are dissolved in 180 ml. dioxane, and the solution is cooled to the melting point of dioxane. Thereafter, a solution of 3.0 g. KOH in 60 ml. water is added while vigorously stirring. The stirring is continued for 5 minutes, whereafter a solution of 3.0 g. $CS_2$ in 5 ml. dioxane is added in one portion. After further stirring for 15 minutes the reaction mixture is diluted with 300 ml. ether, and acidified by adding 9 ml. of concentrated hydrochloric acid. The aqueous phase is removed, and the ether phase washed three times with water. After drying with $Na_2SO_4$, the solution is evaporated to dryness in vacuo at room temperature, and to the residue is added 9 ml. acetone. After standing for some time at 0° C. the crystals of xanthogenic acid are filtered off and air-dried at room temperature. Yield: 1.95 g. The product melts at 120–122° C., but on further heating it solidifies and melts again at 222–224° C. under destruction.

EXAMPLE 4

$\Delta^{1,4}$-pregnadine-3,20-dione-11$\beta$,17$\alpha$,21-triol-21-xanthogenic acid 3.00 g. prednisolone are dissolved by gentle heating in 90 ml. dioxane free from peroxide, and the solution is cooled in a mixture of ice and water to the freezing point of dioxane. Thereafter, a previously cooled solution of 3.0 g. KOH in 30 ml. water is added while vigorously stirring. The stirring and cooling is continued for 5 minutes, whereafter a solution of 3.0 g. $CS_2$ in 5 ml. dioxane is added in one portion. After further stirring for 15 minutes the reaction mixture is diluted with 500 ml. ether and acidified by adding 9 ml. of concentrated hydrochloric acid. The aqueous phase is removed, and the ether phase washed three times with water. After standing for a short time, the prednisolone-21-xanthogenic acid is precipitated. The precipitate is filtered off, washed with ether and air-dried at room-temperature. 2.1 g. of the desired substance are thus obtained. The product melts at 127–128° C., but on further heating it solidifies and re-melts at 227–228° C.

EXAMPLE 5

Δ⁴-pregnene-3,20-dione-11α,17α,21-triol-21-xanthogenic acid 5 g. of the abovenamed substance are dissolved by gentle heating in 150 ml. dioxane, and the solution is cooled in a mixture of ice and water to close to the freezing point of dioxane. A previously cooled solution of 4 g. NaOH in 50 ml. of water is added while vigorously stirring. The stirring and cooling is continued for 5 minutes after which a solution of 8 ml. $CS_2$ in 10 ml. dioxane is added in one portion. After further stirring for 15 minutes the reaction mixture is diluted with 850 ml. ether and acidified by adding 15 ml. of concentrated hydrochloric acid. The aqueous phase is removed and the ether phase is washed two times with water. The 21-xanthogenic acid thereby precipitates and after standing for a short time at 0° C. the precipitate is filtered off, washed with ether and air-dried at room temperature. Yield: 3.5 g. The product melts at 135–137° C., but on further heating it solidifies and melts again at 216–217° C.

EXAMPLE 6

Δ⁴-pregnene-3,11,20-trione-17α,21-diol-21-xanthogenic acid 1.0 g. cortisone is dissolved by heating it in 200 ml. methyl isobutylketone, and the solution is cooled to room temperature. 1 ml. $CS_2$ and 1 g. KOH dissolved in 10 ml. of water are added with vigorous stirring. Stirring is continued for 45 minutes. The lower phase is removed and the methyl isolbutylketone phase is washed with 1 n-hydrochloric acid. The methyl isobutylketone phase is dried with $Na_2SO_4$ and filtered and petrol ether is added. After standing at 0° C. for some time the solution is filtered to remove crystals formed therein and the crystals are dried in air at room temperature. 0.3 g. of the desired xanthogenic acid are obtained.

EXAMPLE 7

The potassium salt of 6α-methyl-cortisone-21-xanthogenic acid 3 g. 6α-methyl-cortisone are dissolved in 9 ml. dimethylformamide. A solution of 3 g. KOH in 2.3 ml. of water and then 3 ml. $CS_2$ are added at room temperature with vigorous stirring. The stirring is continued for 45 minutes. The lower phase is removed, and ether is added to the remaining dimethylformamide phase. A precipitate separates and after standing for a short time the ether is removed by decantation. Acetone is added to the precipitate remaining after decantation, the mixture is filtered and the mother liquor is once more precipitated with ether. The precipitate formed is removed by filtration, washed with ether and dried at room temperature in vacuo over $P_2O_5$. 2.7 g. of the desired potassium salt are obtained.

The ultraviolet spectrum shows maxima at 244 m$\mu$ ($\epsilon$=15,100) and at 304 m$\mu$ ($\epsilon$=13,500) in freshly prepared solution in water.

EXAMPLE 8

Potassium salt of hydrocortisone-21-xanthogenic acid 3 g. hydrocortisone are dissolved in 9 ml. dimethylformamide. A solution of 3 g. KOH in 2.3 ml. water is added with vigorous stirring at room temperature. Thereafter 3 ml. $CS_2$ are added. Stirring is continued for 45 minutes. The lower phase is removed and ether is added to the dimethylformamide phase. A precipitate forms, and after standing for a short time the ether is removed therefrom by decantation. Acetone is added to the precipitate, the mixture is filtered and the mother liquor is once more precipitated with ether. The precipitated substance is filtered off, washed with ether and dried at room temperature in vacuo over $P_2O_5$. 2.7 g. of the desired potassium salt are obtained.

EXAMPLE 9

Potassium salt of prednisolone-21-xanthogenic acid 620 mg. powdered KOH and 2 ml. $CS_2$ are added to a mixture of 2 g. prednisolone and 60 ml. acetone. After stirring for 10 minutes the reaction mixture is filtered and added to ether. A precipitate forms which is removed by filtration, washed with ether and dried at room temperature in vacuo over $P_2O_5$. 2.1 g. of the desired potassium salt are obtained.

EXAMPLE 10

Potassium salt of cortisone-21-xanthogenic acid 3.00 g. cortisone are converted in the manner described in Example 1 to a dried solution of xanthogenic acid in benzene, and the solution is placed under vacuum for 30 minutes at room temperature in order to remove excess $CS_2$. Thereafter, 42 ml. of a 1.6 percent alcoholic solution of KOH is added. After standing for some time the precipitated substance is filtered off, thoroughly washed with benzene and air-dried without heating. 2.4 g. of the desired substance are thus obtained with M.P. 165–167° C. (destruction) and 13.60 percent S (calc.: 13.51 percent S).

EXAMPLE 11

Potassium salt of hydrocortisone-21-xanthogenic acid 1.50 g. hydrocortisone-21-xanthogenic acid are mixed with 10 ml. of a 2 percent alcoholic solution of KOH. The substance dissolved. After standing for a while, the potassium salt begins to separate out, and after further standing for some time, the salt is filtered off, washed with ether and dried. Yield: 1.30 g. 8.12 percent K (calc.: 8.2 percent K).

EXAMPLE 12

Potassium salt of prednisolone-21-xanthogenic acid 1.50 g. prednisolone-21-xanthogenic acid are mixed with 10 ml. of a 2 percent alcoholic solution of KOH. The substance dissolves. After standing for a while, the potassium salt begins to separate out, and after standing for a short time, the salt is filtered off, washed with ether and dried. Yield: 1.40 g.

The ultraviolet spectrum shows maxima at: 244m$\mu$, $\epsilon$=15,200 and at 304 m$\mu$, $\epsilon$=13,400 (water).

EXAMPLE 13

Ethanolamine salt of hydrocortisone-21-xanthogenic acid

To 4.0 g. freshly prepared hydrocortisone-21-xanthogenic acid are added 20 ml. of a 3.1 percent solution of ethanolamine in 99 percent ethanol. The xanthogenic acid is thus dissolved, and after a few minutes, a precipitate is formed. After standing a while, the precipitate is filtered off, thoroughly washed with 99 percent ethanol and subsequently with ether, and dried in vacuo over $P_2O_5$. Thereby, 2.7 g. of the desired salt are obtained. Its ultraviolet spectrum shows maxima at 245 m$\mu$ ($\epsilon$=17,500) and 304 m$\mu$ ($\epsilon$=14,400) in freshly prepared aqueous solution.

EXAMPLE 14

Diethylamine salt of hydrocortisone-21-xanthogenic acid

To 4.0 g. freshly prepared hydrocortisone-21-xanthogenic acid is added 27 ml. of a 2.5 percent solution of diethylamine in 99 percent ethanol. The xanthogenic acid is dissolved and a precipitate is formed. After standing a while the precipitate is filtered off, thoroughly washed with 99 percent ethanol and subsequently with ether and dried in vacuo over $P_2O_5$. Thereby, 3.5 g. of the desired salt are obtained. Its ultraviolet spectrum shows maxima at 246 m$\mu$ ($\epsilon$=18,200) and 304 m$\mu$ ($\epsilon$=14,400) in freshly prepared aqueous solution.

EXAMPLE 15

*Tetraethylammonium salt of hydrocortisone-21-xanthogenic acid*

5.0 g. tetraethylammonium iodide are dissolved in 80 ml. methanol, and to the solution 1 ml. water and 3.5 g. $Ag_2O$ are added. After stirring for 3 hours the mixture is filtered, and the filtrate is diluted with methanol to 100 ml. To 4.0 g. hydrocortisone-21-xanthogenic acid is added 48 ml. of the diluted filtrate. The xanthogenic acid is dissolved, and after a few minutes ether is added. An oily precipitate is formed, the liquid is decanted off, and the precipitate is dissolved in acetone. Ether is again added and the substance thereby precipitated is filtered off, thoroughly washed with ether and dried in vacuo over $P_2O_5$. Thereby, 2.8 g. of the desired salt are obtained. Its ultraviolet spectrum shows maxima at 245 m$\mu$ ($\epsilon=17,500$) and 303 m$\mu$ ($\epsilon=14,000$) in freshly prepared aqueous solution.

EXAMPLE 16

*N-ethylpiperidine salt of hydrocortisone-21-xanthogenic acid*

To 4.0 g. freshly prepared hydrocortisone-21-xanthogenic acid are added 4.0 g. N-ethylpiperidine dissolved in 20 ml. of 99 percent ethanol. Thereby, the xanthogenic acid is dissolved and after a few minutes a precipitate is formed. The precipitate is filtered off, washed with ether and dried in vacuo over $P_2O_5$. Thereby, 4.4 g. of the desired salt are obtained. Its ultraviolet spectrum shows maxima at 246 m$\mu$ ($\epsilon=17,600$) and 303 m$\mu$ ($\epsilon=13,800$) in freshly prepared aqueous solution.

EXAMPLE 17

*Calcium salt of hydrocortisone-21-xanthogenic acid*

To 85 mg. calciumhydroxide in a mortar are added 1 g. freshly prepared hydrocortisone-21-xanthogenic acid and 10 ml. 99 percent ethanol. The mixture is stirred with a pistil for five minutes and then filtered. The solid substance is washed with 99 percent ethanol, ether and dried in vacuo at room temperature over $P_2O_5$. Thereby, 1.0 g. of the desired salt are obtained. Its ultraviolet spectrum shows maxima at 245 m$\mu$ ($\epsilon=30,000$) and 304 m$\mu$ ($\epsilon=22,000$) in freshly prepared aqueous solution.

EXAMPLE 18

*Zinc salt of hydrocortisone-21-xanthogenic acid*

To 452 mg. zinchydroxide in a mortar are added 40 ml. 99 percent ethanol and 4.0 g. freshly prepared hydrocortisone-21-xanthogenic acid. The mixture is stirred with a pistil for 5 minutes and then filtered. The solid substance is washed with 99 percent ethanol, ether and dried in vacuo over $P_2O_5$. Thereby 3.9 g. of the desired salt are obtained. Its ultraviolet spectrum shows maxima at 245 m$\mu$ ($\epsilon=30,400$) and 304 m$\mu$ ($\epsilon=28,100$) in freshly prepared aqueous 0.1 n NaOH-solution.

Aqueous solutions of the salts for instance the potassium salts or diethanol amine salts are rapidly hydrolyzed, the half-life period at pH 7.2 and at 37° C. being 15 minutes in case of the said salts. Thereby, the steroid hormone in question for instance hydrocortisone will be liberated. When solutions of these salts dissolved in a small volume of water are intravenously injected the hydrocortisone or, generally, the corticoid involved in the xanthogenate will be liberated in the blood after a short period of time.

What I claim is:

1. A compound selected from the group consisting of 21-xanthogenates and 21-xanthogenic acids of $\Delta^4$-pregnenes and $\Delta^{1,4}$-pregnadienes having keto groups in the 3- and 20-positions and a hydroxy group in the 17$\alpha$-position a group in the 11-position selected from the groups consisting of oxygen and hydroxy, and a group in the 6$\alpha$-position selected from the groups consisting of hydrogen and methyl, but no other substituents.

2. $\Delta^4$-pregnene-3,11,20-trione-17$\alpha$,21 - diol - 21-xanthogenic acid.

3. $\Delta^4$-pregnene-3,20-dione-11,17$\alpha$,21 - triol - 21-xanthogenic acid.

4. $\Delta^{1,4}$-pregnadiene-3,11,20-trione - 17$\alpha$,21 - diol-21-xanthogenic acid.

5. $\Delta^{1,4}$-pregnadien-3,20-dione - 11,17$\alpha$,21 - triol - 21-xanthogenic acid.

6. A $\Delta^4$-6$\alpha$-methyl pregnene derivative as set forth in claim 1.

7. Potassium salt of the $\Delta^4$-6$\alpha$-methyl-pregnene compound according to claim 6 being $\Delta^4$-6$\alpha$-methyl-pregnene-3,11,20-trione-17$\alpha$,21-diol-21-xanthogenate.

8. A method for the production of the compounds according to claim 1 in which a compound selected from the group consisting of $\Delta^4$-pregnenes having keto groups in the 3- and 20-positions and hydroxy groups in the 17- and 21-positions, and $\Delta^{1,4}$-pregnadienes having keto groups in the 3- and 20-positions and hydroxy groups in the 17$\alpha$- and 21-positions and a group in the 6$\alpha$-position selected from the groups consisting of hydrogen and methyl, but no other substituents, is dissolved in an organic solvent at least partly miscible with water and reacted with an alkali metal hydroxide, the alcoholate thereby formed being reacted with carbon disulphide after which the desired compound is isolated from the reaction mixture thus obtained.

9. Therapeutic dosis unit for intravenous injection of the substances according to claim 1 consisting of a therapeutic dose of a solid 21-xanthogenic acid as set forth in claim 1 and containing an aqueous solution of the equivalent amount of a base selected from the group consisting of ammonia, potassium hydroxide, calcium hydroxide, zinc hydroxide, and an aliphatic monoamine having not more than 7 carbon atoms and not more than one alcoholic hydroxyl group and no other substituents, forming therewith a clear aqueous solution.

10. The dosis unit of claim 9 in which the base is ammonia.

11. The dosis unit of claim 9 in which the base is potassium hydroxide.

12. The dosis unit of claim 9 in which the base is calcium hydroxide.

13. The dosis unit of claim 9 in which the base is zinc hydroxide.

14. The dosis unit of claim 9 in which the base is an aliphatic monoamine having not more than one alcoholic hydroxyl group and no other substituents.

No references cited.